US009541218B2

(12) United States Patent
Liles et al.

(10) Patent No.: US 9,541,218 B2
(45) Date of Patent: Jan. 10, 2017

(54) UNIVERSAL INDICATOR POST

(71) Applicant: NIBCO INC., Elkhart, IN (US)

(72) Inventors: Philip A. Liles, Elkhart, IN (US); Ken A. Rinkenberg, Goshen, IN (US)

(73) Assignee: NIBCO INC., Elkhart, IN (US)

( * ) Notice: Subject to any disclaimer, the term of this patent is extended or adjusted under 35 U.S.C. 154(b) by 233 days.

(21) Appl. No.: 14/288,664

(22) Filed: May 28, 2014

(65) Prior Publication Data

US 2014/0360422 A1 Dec. 11, 2014

Related U.S. Application Data

(60) Provisional application No. 61/831,252, filed on Jun. 5, 2013.

(51) Int. Cl.
*F16K 37/00* (2006.01)

(52) U.S. Cl.
CPC ....... *F16K 37/0008* (2013.01); *F16K 37/0058* (2013.01)

(58) Field of Classification Search
CPC .............................. F16K 37/00; F16K 37/0008
USPC .................. 116/277, 282; 137/553, 556
See application file for complete search history.

(56) References Cited

U.S. PATENT DOCUMENTS

| 824,163 | A | * | 6/1906 | Whitney | ............. | F16K 37/0008 |
| | | | | | | 116/277 |
| 951,927 | A | * | 3/1910 | Whitney | ............. | F16K 37/0008 |
| | | | | | | 116/277 |
| 1,251,792 | A | | 1/1918 | Lofton | | |
| 1,338,263 | A | | 4/1920 | Thorne at al. | | |
| 1,386,065 | A | | 8/1921 | Lofton | | |
| 3,554,160 | A | | 1/1971 | Fortune et al. | | |
| RE28,069 | E | | 7/1974 | Fortune et al. | | |
| 4,297,966 | A | | 11/1981 | Liberman | | |
| 4,497,340 | A | | 2/1985 | Gain, Jr. | | |
| 5,220,942 | A | | 6/1993 | Garvin, Jr. et al. | | |
| 2011/0017324 | A1 | * | 1/2011 | Emanuel | ................... | E03B 7/09 |
| | | | | | | 137/556 |

FOREIGN PATENT DOCUMENTS

GB        173558 A  * 12/1921  ......... F16K 37/0008

OTHER PUBLICATIONS

Mueller Co. UL/FM Fire Protection Products E-1 Brochure (4 pages), Jul. 2011.
Mueller A-20806/A-20807 Adjustable Vertical Indicator Post Installation Instructions (2 pages), undated.
Kennedy Valve Indicator Post Style 2945 Brochure (3 pages), May 2, 2012.

* cited by examiner

*Primary Examiner* — R. A. Smith
(74) *Attorney, Agent, or Firm* — Price Heneveld LLP (57) ABSTRACT

An indicator post has a head assembly for use with an underground post indicator valve or a wall mounted post indicator valve. The head assembly includes an upper body having a removable cap rotatably supporting an operating stem coupled to an operating rod for engaging the valve. A leading bogie assembly is threadably mated to a threaded sleeve of the operating stem and includes open and shut targets slideably supported on the bogie assembly to allow adjustment of the targets for valves that open and shut with different numbers of revolutions.

20 Claims, 7 Drawing Sheets

UNIVERSAL INDICATOR POST

CROSS-REFERENCE TO RELATED APPLICATIONS

This application claims priority under 35 U.S.C. §119(e) and the benefit of U.S. Provisional Application No. 61/831,252 entitled UNIVERSAL INDICATOR POST, filed on Jun. 5, 2013, by Philip A. Liles et al., the entire disclosure of which is incorporated herein by reference.

BACKGROUND OF THE INVENTION

The present invention relates to an indicator post which can be employed for actuating and indicating the status of underground or wall mounted valves.

Indicator posts are employed with water supply systems, particularly those employed in in commercial establishments and also in fire sprinkler water supplies to actuate valves supplying water to such systems. They specifically provide a visual display of the status of the valve as open or shut. Due to different mounting of such valves either underground or within the walk of the buildings in other installations, the design of the indicator posts have been different requiring different castings for use in connection with the manufacture and assembly of such indicator posts.

Upright posts used with underground valves typically have a removable handle which can be locked once the valve is in the desired position and is removed and attached to an operating stem for the actuation of the valve. As the handle is rotated, a threaded sleeve associated with the operating stem moves a bogie having display targets with indicia indicating the open or shut position of the associated valve. Depending on the valve employed and its size, the rotation required to fully open and shut a valve can vary from 9 to 50 or more complete turns. Thus it is necessary to have the indicator targets adjustable to allow for the difference in number of rotations of the operating rod coupled to the different valves. With past indicator posts, it has been necessary to disassemble the bogie assembly and move the individual open or shut targets to their respective positions when the valve is fully opened or fully shut. This adjustment has required considerable effort.

Similarly, with wall mounted indicator posts, the number of turns required utilizing, typically a handwheel, varies with the valve type and again the indicator post targets move a distance related to the number of turns the valve requires to fully open or fully shut. Such wall mounted posts also have required disassembly for the synchronization of the indicating targets with the valve handwheel rotation.

Thus there exists a need for an indicator post which can be used for both upright indicator posts used for underground valves as wall as wall mounted indicator posts for wall mounted valves utilizing the same components. Further, it would be desirable to have indicator targets which can be easily adjustable to display either open or shut positions regardless of the number of rotations required for given valve to move between fully open and fully shut positions.

SUMMARY OF THE INVENTION

The present invention provides a solution to these problems by providing an upper body which can be employed for both upright and wall mounted indicator posts. A cap and an operating stem likewise is identical for both applications as is a bogie assembly including target plates displaying open and shut valve positions. The leading bogie assemblies include slideable and lockable adjustment targets or placards showing open or shut positions which can be selectively slid along a support rod and locked into position with a locking set screw to quickly and easily adjust the display of the placards when valves requiring a different number of rotations are employed.

Indicator posts embodying the present invention comprise a head assembly for use with an underground post indicator valve or a wall mounted post indicator valve. The head assembly includes an upper body having a removable cap rotatably supporting an operating stem coupled to an operating rod for engaging the valve. A leading bogie assembly is threadably mated to a threaded sleeve of the operating stem and includes open and shut targets slideably supported on the bogie assembly to allow adjustment of the targets for valves that open and shut with different numbers of revolutions. The use of a single head assembly which can be employed with either type of valve system provides an economical product using the same components. The leading bogie with its slideably adjustable targets provides ease of installation of the indicator post with different types of valves.

These and other features, advantages and objects of the present invention will be further understood and appreciated by those skilled in the art by reference to the following specification, claims, and appended drawings.

DETAILED DESCRIPTION

Figure 1:
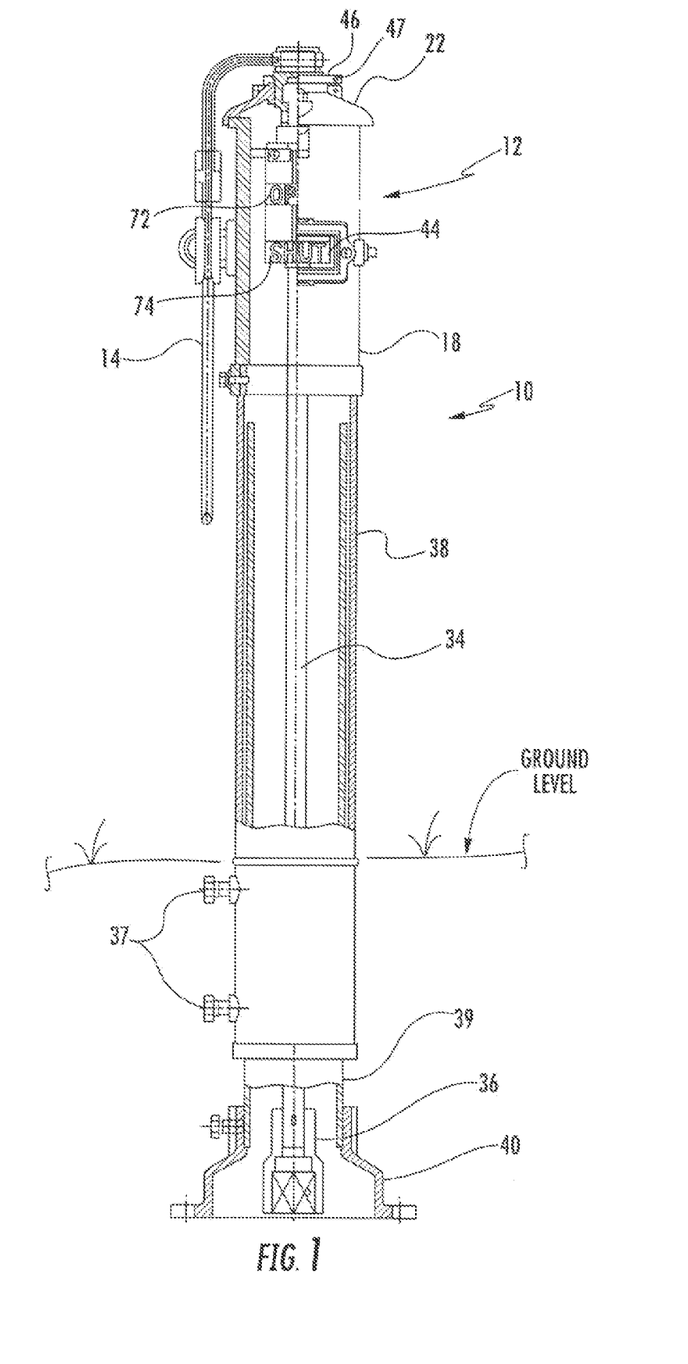
FIG. 1 is a front elevational view partly in cross section of an upright indicator post assembly including the head assembly of the present invention.
Figure 2:
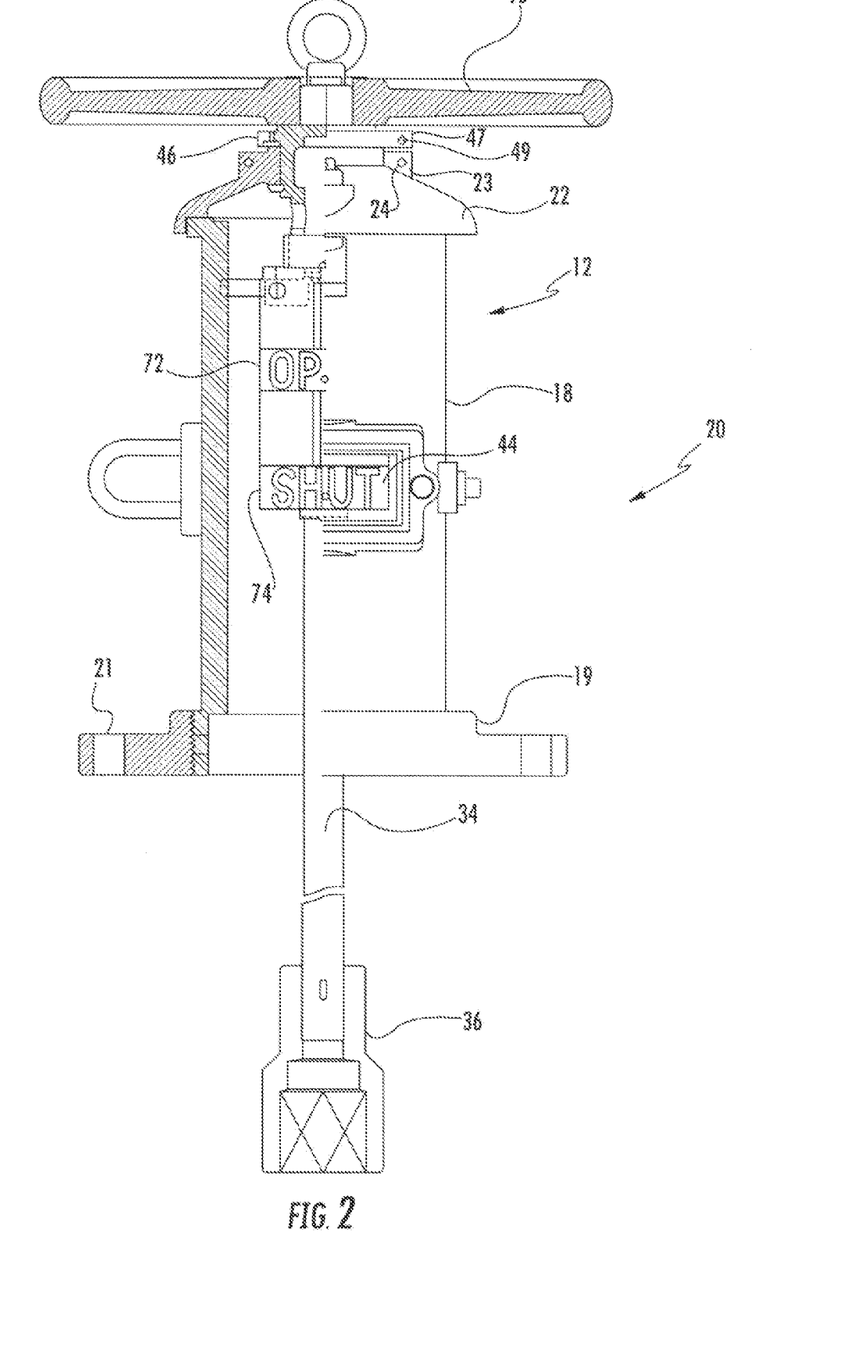
FIG. 2 is a front elevational view partly in cross section of a wall mount indicator post assembly including the head assembly of the present invention.

Referring initially to FIGS. 1 and 2, FIG. 1 shows an upright indicator post 10 embodying the present invention while FIG. 2 shows a wall-mounted indicator post 20. Each of the indicator posts include an identical head assembly 12. The same components in assemblies 10 and 20 bear the same part numbers. The only difference between the upright post assembly 10 and the wall-mounted post assembly 20 is the use of a lever-type operating wrench 14 for the upright post 10 and a hand wheel 16 on the wall-mounted indicator post 20. Each of the head assemblies 12 include an upper generally cylindrical body 18 which houses the internal components discussed below. The generally cylindrical body 18 is covered by a cap 22 through which operating stem assembly 30 (FIG. 3) extends terminating in a nut 32 to which the operating wrench 14 or wheel 16 is secured for rotating an operating rod 34 (FIGS. 1 and 2) which is coupled to the stem of a valve (not shown) by a conventional coupling 36.

Figure 8:
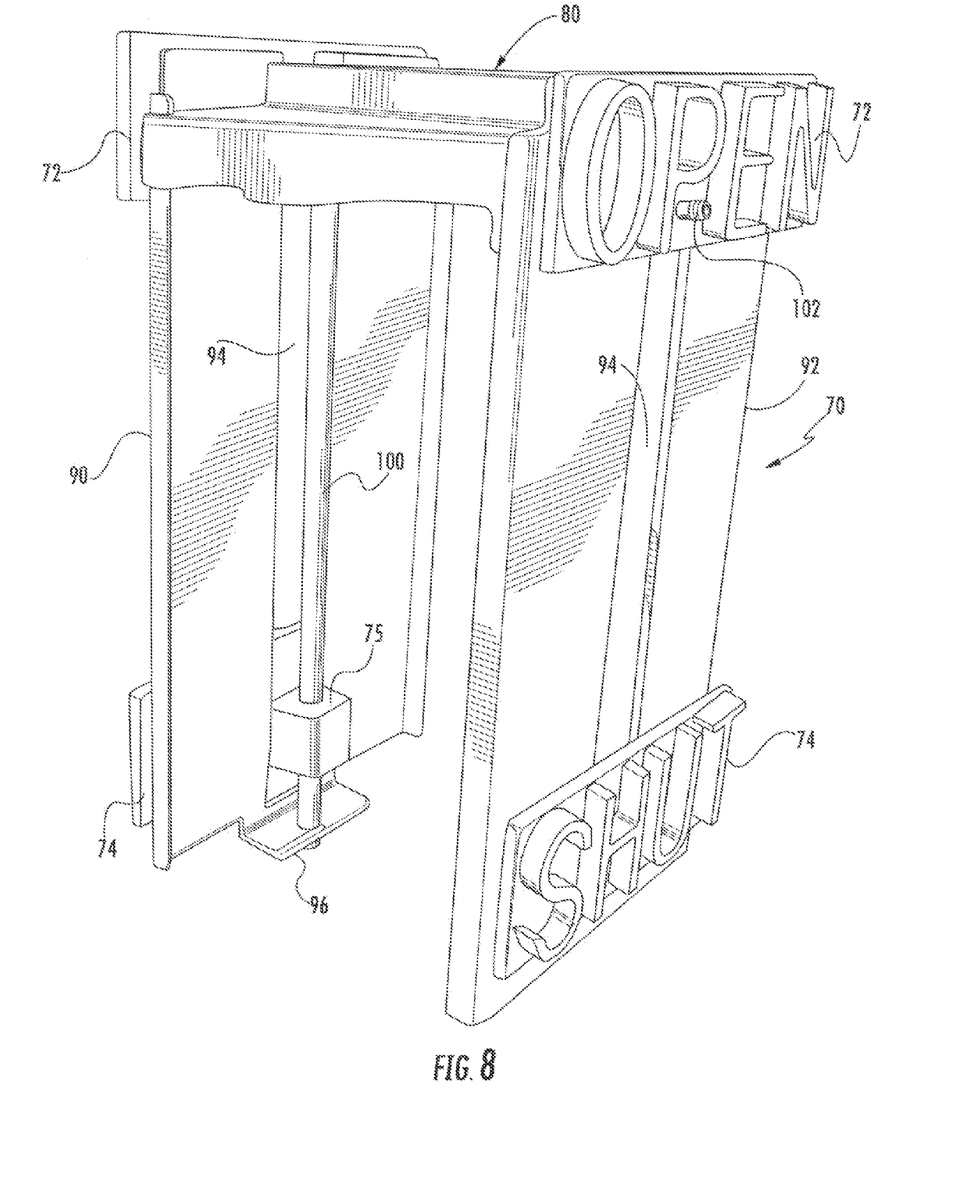
FIG. 8 is an enlarged left side perspective view of the leading bogie assembly.
Figure 9:
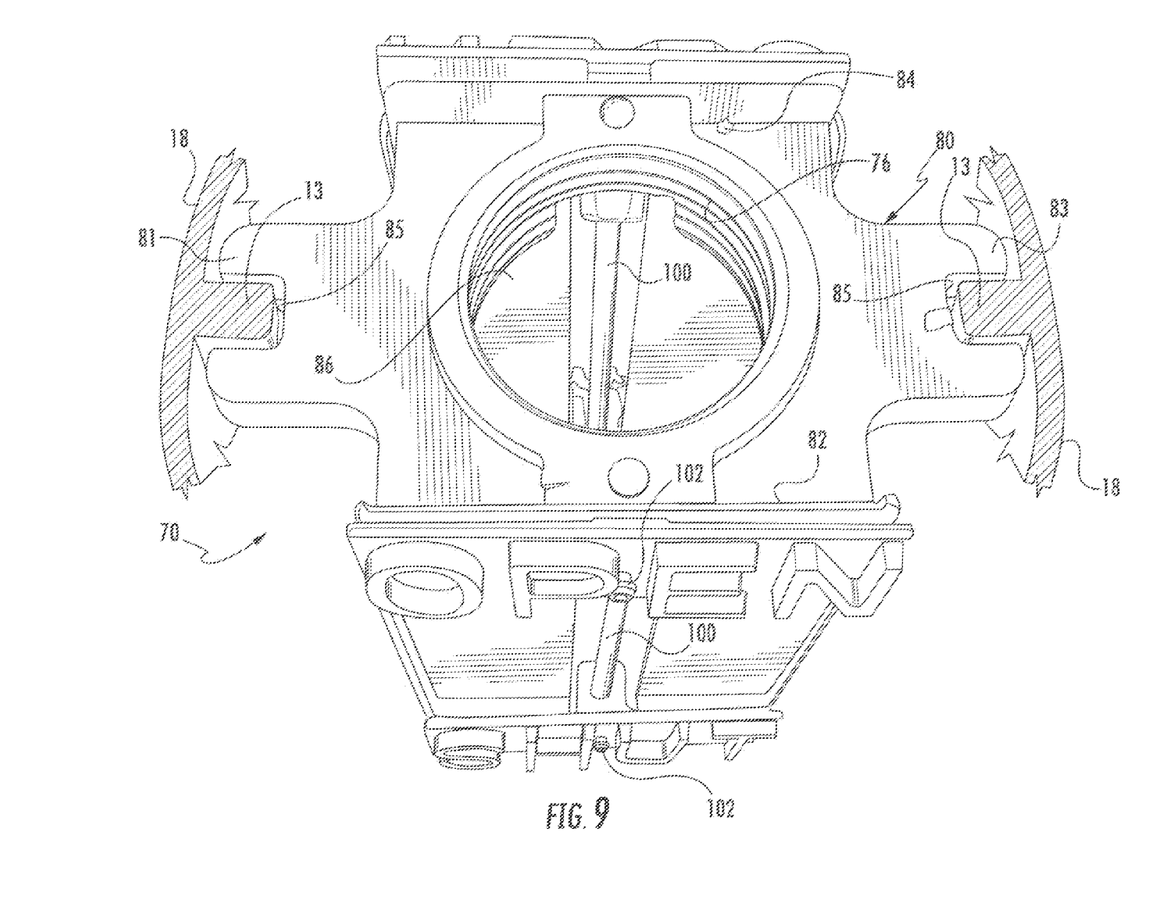
FIG. 9 is top perspective view of the leading bogie assembly.
Figure 10:
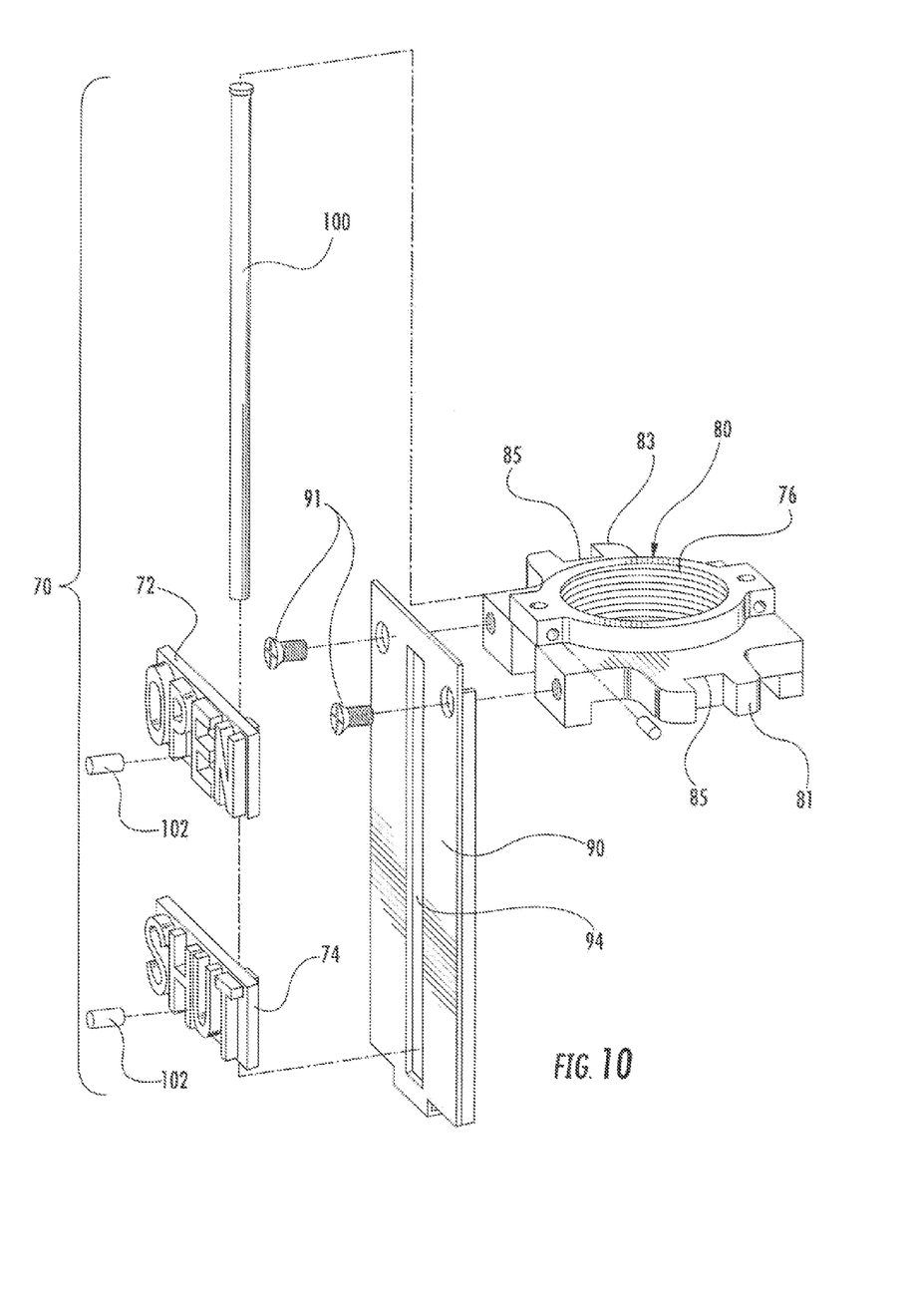
FIG. 10 is an exploded perspective view of one side of the leading bogie assembly.

The upper body 18, as seen in FIG. 1, of the upright indicator post 10 coupled to an adjustable cylindrical center body 38 which typically is partially underground and is coupled using fasteners 37 to a cylindrical barrel 39, in turn, coupled to lower body 40 associated with an underground post indicator valve. The identical upper bodies 18 of posts 10 and 20 are shown in greater detail in FIG. 3 and include a pair of opposed windows 42 and 44 for displaying the open and shut targets 72 and 74 respectively of a leading bogie assembly 70 which is best seen in FIGS. 8-10. The upper body 18 of the wall-mounted indicator post 20 is threaded to mounting flange 19 (FIG. 2) which can be secured by fasteners extending through apertures 21 into a wall-mounting plate or other conventional attachment for such an indicator post.

Figure 3:
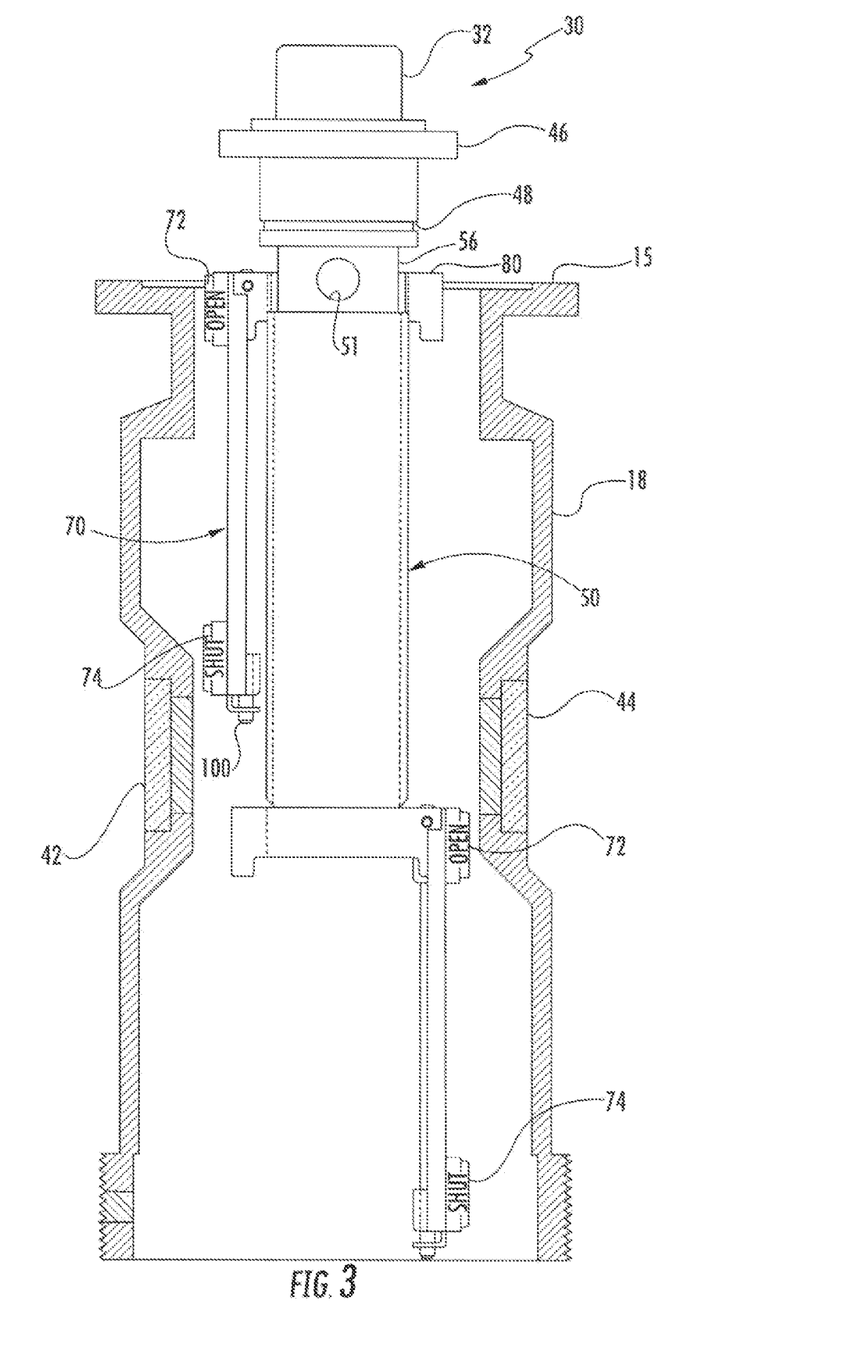
FIG. 3 is an enlarged vertical cross-sectional view of the body of the head assembly showing the operating stem and leading bogie.
Figure 4:
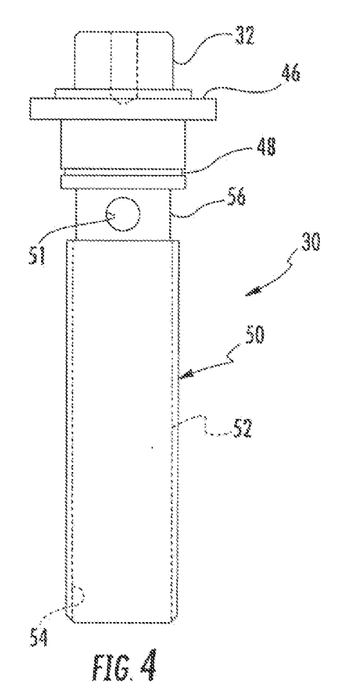
FIG. 4 is a front elevational view of the operating stem.
Figure 5:
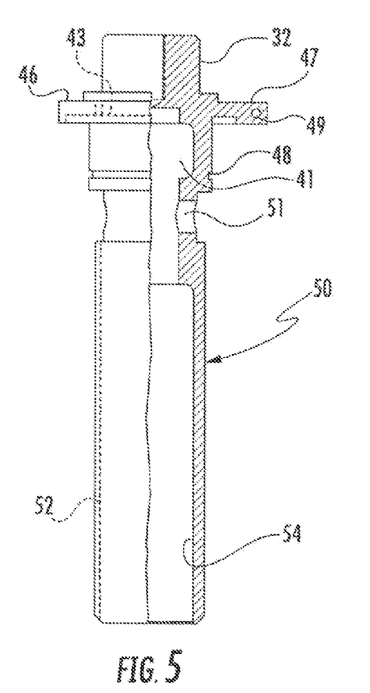
FIG. 5 is a right side elevational view of the operating stem, partly in cross section.
Figure 6:
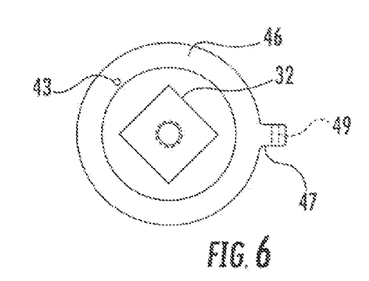
FIG. 6 is a top view of the system shown in FIG. 5.
Figure 7:
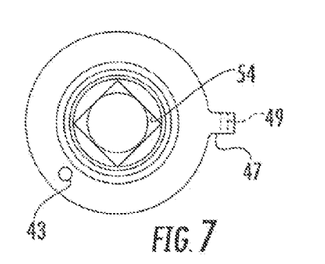
FIG. 7 is a bottom view of the stem shown in FIG. 5.

As seen in FIG. 3, the upper body 18 supports the operating stem 30 which includes a circular flange 46 which rests on the upper surface of cap 22 of the head assembly 12, as seen in FIGS. 1 and 2. A circular recess 48 is formed in vertically spaced relationship to flange 46 and receives a conventional snap ring to prevent the operating stem from being removed from the head assembly 12. The operating stem is seen in detail in FIGS. 4-7 and has a generally cylindrical body 50 with a lower end which is externally threaded at 52 for threadably fitting within a threaded aperture 76 formed in the leading bogie 70 as best seen in FIG. 9. The operating stem 30 includes a central aperture 54 which is square and slightly larger than the square operating rod 34 that fits within aperture 54 in the operating stem in a conventional manner. Operating stem 30 includes an undercut recess 56, seen in FIGS. 3-5, which prevents the leading bogie 70 from threading above the top mounting flange 15 of the upper body 18. Cap 22 is conventionally secured to flange 15 by suitable fasteners. The rotation of the operating stem 30 by handwheel 16 or lever handle 14 causes the rotation of the operating rod 34 to open and close a valve attached to coupling 36 in a conventional manner. Rotation of the operating stem 30 also moves the leading bogie 70 to display either the open or closed state of the valve through windows 42 and 44 as described below. A tab 47 on flange 46 includes an aperture 49 which is aligned with a similar tab 23 and aperture 24 on cap 22, as best seen in FIG. 2, to allow sealing wire to extend between the cap 22 and operating stem 30 when the valve is fully open. This provides the additional safety feature of allowing an inspector to determine if the valve has been tampered with or changed in position. Flange 46 includes an aperture 43 to allow the admission of a lubricant into the control volume 41 of operating stem 30 and extend through aperture 51 stem body 50 to reach the threads 52.

The leading bogie assembly 70 includes a leading bogie 80, which has a central aperture 86 threaded at 76. Aperture 86 is threaded and dimensioned to interface and threadably move on the threads 52 of body 50 of the operating stem 30. Bogie 80 has a pair of outwardly extending alignment ears 81 and 83 ending with a slot 85 therebetween. As best seen in FIG. 9, the slots align with inwardly projecting, vertically extending, elongated guide rails 13 of the upper body 18. This prevents rotation of the leading bogie within the upper body 18 as the valve control is rotated and interengaging threads 52, 76 cause the bogie assembly 70 to raise and lower the targets 72 and 74 with respect to the opposed viewing windows 42 and 44 of the indicator post.

Leading bogie 80 includes opposed outer surfaces 82 and 84 (FIG. 9) which receive end extension plates 90 and 92 (FIG. 8) secured thereto by suitable fasteners 91 (FIG. 10). Each plate includes a vertical slot 94 for slideably receiving the targets 72 and 74. Extension plates 90 and 92 each include an inwardly extending ledge 96 at the lower end, as best seen in FIG. 8, for supporting a guide rod 100 on which the targets 72 and 74 can slide. Each of the targets 72 and 74 include an inwardly projecting tab 75 (FIG. 8) with an aperture which slides on rod 100 and within slot 94 of the extension plates and allows the targets 72 and 74 on each side of the bogie assembly 70 to be slideably vertically adjusted. For such purpose, each of the targets 72 and 74 include a threaded aperture for receiving a set screw 102 (FIGS. 8 and 9) which selectively engages rod 100 when tightened, allowing the targets to be adjusted for valves with different numbers of rotations between open and shut positions. The installation and adjustment of the targets on rod 100 can be accomplished according to a table provided in an installation guide. Thus, the targets 72 and 74 can be prepositioned on rod 100 and within slots 94 in the plates 90, 92 a predetermined distance apart depending on the valve for which the indicator post will be used. Also, the top open target is positioned a predetermined distance below cap 22.

With the present invention, both the indicator posts have identical head assemblies 12 with the same internal components thereby greatly reducing the cost of manufacturing and assembly of indicator posts used for underground and wall mounted valves. They include the unique leading bogie assembly 70 which provides easy adjustment of the open and shut targets 72, 74 with respect to the windows 42, 44 provided in the upper body 18.

It will become apparent to those skilled in the art that various modifications to the preferred embodiment of the inventions as described herein can be made without departing from a spirit or scope of the invention as defined by the appended claims.

The invention claimed is:

1. An indicator post for an underground or wall mounted post indicator valve comprising:
   a head assembly having an upper body with a removable cap;
   an operating stem rotatably supported by said cap, said operating stem including a threaded body for receiving a leading bogie assembly including slideably adjustable targets for displaying the status of the valve;
   said leading bogie assembly including a leading bogie having an aperture threadably coupled to said threaded body of said operating stem, said leading bogie including opposed surfaces and a pair of extension plates coupled to said opposed surfaces, said extension plates each including a guide slot, and wherein said targets include a tab extending into said guide slot for guided movement during adjustment of said targets; and
   an operating rod having one end coupled to said operating stem and an opposite end coupled to one of an underground valve and a wall mounted valve for the actuation of the valve coupled to said operating rod.

2. The indicator post as defined in claim 1 wherein said operating stem includes an end extending through said cap for receiving one of an operating wrench or hand wheel for opening and shutting a post indicator valve coupled to said operating rod.

3. The indicator post as defined in claim 1 wherein said targets of said leading bogie assembly are adjustable for displaying open or shut positions of the post indicator valve.

4. The indicator post as defined in claim 3 wherein said upper body includes at least one window for displaying at least one of said targets of said leading bogie assembly.

5. The indicator post as defined in claim 4 wherein said targets of said leading bogie assembly face opposed directions and said at least one window of said upper body includes a pair of opposed windows on said upper body for displaying said targets of said leading bogie assembly.

6. An indicator post for an underground or wall mounted post indicator valve comprising:
a head assembly having an upper body with a removable cap;
an operating stem rotatable supported by said cap, said operating stem including a threaded body for receiving a leading bogie assembly including targets for displaying the status of the valve;
said leading bogie assembly including a leading bogie having an aperture threadably coupled to said threaded body of said operating stem, said leading bogie including a pair of alignment ears for engaging inwardly extending guide rails on said upper body such that rotation of said operating stem moves said leading bogie vertically within said upper body, wherein said leading bogie includes opposed surfaces orthogonal to said alignment ears and said leading bogie assembly further includes a pair of extension plates coupled to said opposed surfaces, said extension plates each including a guide slot, and wherein said targets include a tab extending in said guide slot for guided movement during adjustment said targets; and
an operating rod having one end coupled to said operating stem and an opposite end coupled to one of an underground valve and a wall mounted valve for the actuation of the valve coupled to said operating rod.

7. The indicator post as defined in claim 6 wherein said leading bogie assembly further includes a target guide rod extending from said bogie in parallel spaced relationship to each of said extension plates and wherein said tabs of said targets each include a slide aperture for slideably mounting said targets to said target guide rods.

8. The indicator post as defined in claim 7 wherein said targets include a threaded aperture communicating with said slide apertures and a set screw for engaging said target guide rod for securing said target in an adjusted position along said target guide rods to align the open target with said window of said upper body when the valve is fully open and the shut target with said window of said upper body when the valve is in a fully shut position.

9. The indicator post as defined in claim 8 wherein said extension plates include an inwardly extending ledge at an end opposite said leading bogie for supporting an end of said target guide rod remote from said leading bogie.

10. An improved leading bogie assembly for an indicator post comprising:
a leading bogie including a pair of targets for displaying the open and shut condition of an indicator post valve, said leading bogie having a threaded aperture for threadably coupling to a threaded body of an operating stem associated with the indicator post, said leading bogie including opposed surfaces for receiving a pair of vertically extending extension plates;
said extension plates each including a guide slot, and wherein said targets include a tab extending into an associated guide slot for guided movement during adjustment of said targets; and
a slideable coupling for coupling said targets to said vertically extending extension plates.

11. An improved leading bogie assembly for an indicator post comprising:
a leading bogie having a threaded aperture for threadably coupling to a threaded body of an operating stem associated with the indicator post, said leading bogie including opposed surfaces for receiving a pair of vertically extending extension plates; said leading bogie further including a pair of alignment ears located in orthogonal relationship to said opposed surfaces for engaging inwardly extending guides on an upper body of the indicator post such that rotation of the operating stem moves said leading bogie vertically within an upper body of an indicator post;
a pair of targets for displaying the open and shut condition of an indicator post valve; and
a slideable coupling for coupling said targets to said vertically extending extension plates, wherein said extension plates each include a guide slot, and wherein said targets include a tab extending in said guide slot for guided movement during adjustment of said targets.

12. The leading bogie assembly as defined in claim 11 wherein said leading bogie assembly further includes a target guide rod extending from said leading bogie in parallel spaced relationship to each of said extension plates and wherein said tabs of said targets each include a slide aperture for slideably mounting said targets to said target guide rods.

13. The leading bogie assembly as defined in claim 12 wherein said targets include a threaded aperture communicating with said slide apertures and a set screw for engaging said target guide rod for securing said target in an adjusted position along said target guide rods to align the open target with a window of the upper body of the indicator post when the valve is fully open and the shut target with the window the upper body when the valve is in a fully shut position.

14. The leading bogie assembly as defined in claim 13 wherein said extension plates include an inwardly extending ledge at an end opposite said leading bogie for supporting an end of said target guide rod remote from said leading bogie.

15. A universal indicator post for use for controlling are underground or wall mounted post indicator valve, said universal indicator post comprising:
a head assembly having an upper body with a removable cap; said upper body having at least one window for displaying the open or shut status of a post indicator valve;
a leading bogie assembly including slideably adjustable targets for displaying the open or the shut positions of the post indicator valve, wherein said leading bogie assembly includes opposed surfaces and a pair of extension plates coupled to said opposed surfaces, said extension plates each including a guide slot, and wherein said targets include a tab extending in said guide slot for guided movement during adjustment of said targets;
an operating stem rotatably supported by said cap, said operating stem including a threaded body for receiving said leading bogie assembly; and
an operating rod having one end coupled to said operating stem and opposite end coupled to one of an underground valve and a wall mounted valve for the actuation of the valve coupled to said operating rod.

16. The indicator post as defined in claim 15 wherein said leading bogie assembly includes a leading bogie having a threaded aperture threadably coupled to said threaded body of said operating stem, said leading bogie including opposed faces for receiving a pair of vertically extending extension plates; said leading bogie further including a pair of alignment ears located in orthogonal relationship to said opposed faces for engaging inwardly extending guides said upper body such that rotation of said operating stem moves said leading bogie vertically within said upper body.

17. A universal indicator post for use for controlling an underground or wall mounted post indicator valve, said universal indicator post, comprising:
   a head assembly having an upper body with a removable cap; said upper body having at least one window for displaying the open or shut status of a post indicator valve;
   an operating stem rotatably supported by said cap, said operating stem including a threaded body for receiving a leading bogie assembly;
   a leading bogie assembly including slideably adjustable targets for displaying the open or the shut positions of the post indicator valve, wherein said leading bogie assembly includes a leading bogie having a threaded aperture threadably coupled to said threaded body of said operating stem, said leading bogie including opposed faces for receiving a pair of vertically extending extension plates, wherein said extension plates each include a guide slot, and wherein said targets include a tab extending in said guide slot for guided movement during adjustment of said targets;
   said leading bogie further including a pair of alignment ears located in orthogonal relationship to said opposed faces for engaging inwardly extending guides on said upper body such that rotation of said operating stem moves said leading bogie vertically within said upper body; and
   an operating rod having one end coupled to said operating stem and an opposite end coupled to one of an underground valve and a wall mounted valve for the actuation of the valve coupled to said operating rod.

18. The indicator post as defined it claim 17 wherein said leading bogie assembly further includes a target guide rod extending from said leading bogie in parallel spaced relationship to each of said extension plates and wherein said tabs of said targets each include a slide aperture for slideably mounting said targets to said target guide rods.

19. The indicator post as defined in claim 18 wherein said targets include a threaded aperture communicating with said slide apertures and a set screw for engaging said target guide rod for securing said target in an adjusted position along said target guide rods to align the open target with a window of the upper body of the indicator post when an associated post indicator valve is fully open and the shut target with the window of the upper body when the valve is in a fully shut position.

20. The indicator post as defined in claim 19 wherein said extension plates include an inwardly extending ledge at an end opposite said leading bogie for supporting an end of said target guide rod remote from said leading bogie.

\* \* \* \* \*

UNITED STATES PATENT AND TRADEMARK OFFICE
CERTIFICATE OF CORRECTION

PATENT NO. : 9,541,218 B2  Page 1 of 1
APPLICATION NO. : 14/288664
DATED : January 10, 2017
INVENTOR(S) : Liles et al.

It is certified that error appears in the above-identified patent and that said Letters Patent is hereby corrected as shown below:

In the Claims

Column 5, Line 13, "rotatable" should be --rotatably--;

Column 5, Line 30, after "adjustment" insert --of--;

Column 6, Line 34, after "window" insert --of--;

Column 6, Line 40, "are" should be --an--;

Column 6, Line 60, after "and" insert --an--;

Column 7, Line 3, after "guides" insert --on--; and

Column 8, Line 9, "it" should be --in--.

Signed and Sealed this
Eleventh Day of April, 2017

Michelle K. Lee
*Director of the United States Patent and Trademark Office*